United States Patent [19]

Edwards

[11] Patent Number: 5,449,999
[45] Date of Patent: Sep. 12, 1995

[54] RECTIFIER LEAKAGE COMPENSATED ALTERNATOR PHASE DETECTION SYSTEM AND METHOD

[75] Inventor: A. J. Edwards, Hoffman Estates, Ill.

[73] Assignee: Motorola, Inc., Schaumburg, Ill.

[21] Appl. No.: 258,885

[22] Filed: Jun. 13, 1994

[51] Int. Cl.$^6$ ............................................. H02P 9/00
[52] U.S. Cl. ...................................... 322/28; 322/29
[58] Field of Search .................. 322/11, 20, 28, 29, 322/32, 99; 324/158

[56] References Cited

U.S. PATENT DOCUMENTS

| | | | |
|---|---|---|---|
| 4,486,702 | 12/1984 | Edwards | 322/28 |
| 4,584,515 | 4/1986 | Edwards | 322/28 |
| 5,214,371 | 5/1993 | Naidu | 322/29 |
| 5,225,764 | 7/1993 | Falater | 322/28 |
| 5,254,935 | 10/1993 | Vercesi et al. | 322/29 |
| 5,376,876 | 12/1994 | Bauser et al. | 322/28 |

Primary Examiner—Steven L. Stephan
Assistant Examiner—Nicholas Ponomarenko
Attorney, Agent, or Firm—Nicholas C. Hopman

[57] ABSTRACT

An alternator phase detection system for an alternator has a stator winding (115) that provides a stator winding signal bounded within a range. The stator winding signal has a leakage magnitude when the alternator is stationary and a charging magnitude when the alternator is rotating. A leakage compensation circuit (245, 247) biases the stator winding (115) of the alternator by providing a leakage compensation current to the stator winding if the leakage magnitude of the stator winding signal is positioned apart from a boundary of the range, thereby changing the magnitude of the stator winding signal which negates the erroneous effect of rectifier leakage on measurement of alternator motion. A comparator circuit (101) provides an alternator startup state of a status signal (137) if the magnitude of the stator winding signal does noir exceed a predetermined threshold.

20 Claims, 1 Drawing Sheet

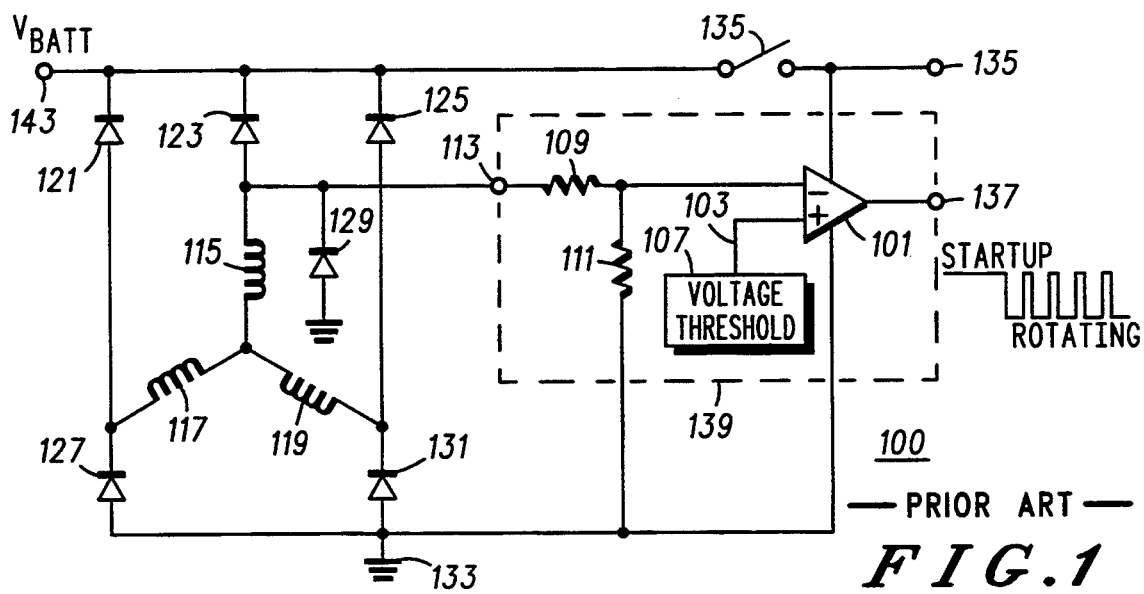
FIG.1
FIG.2
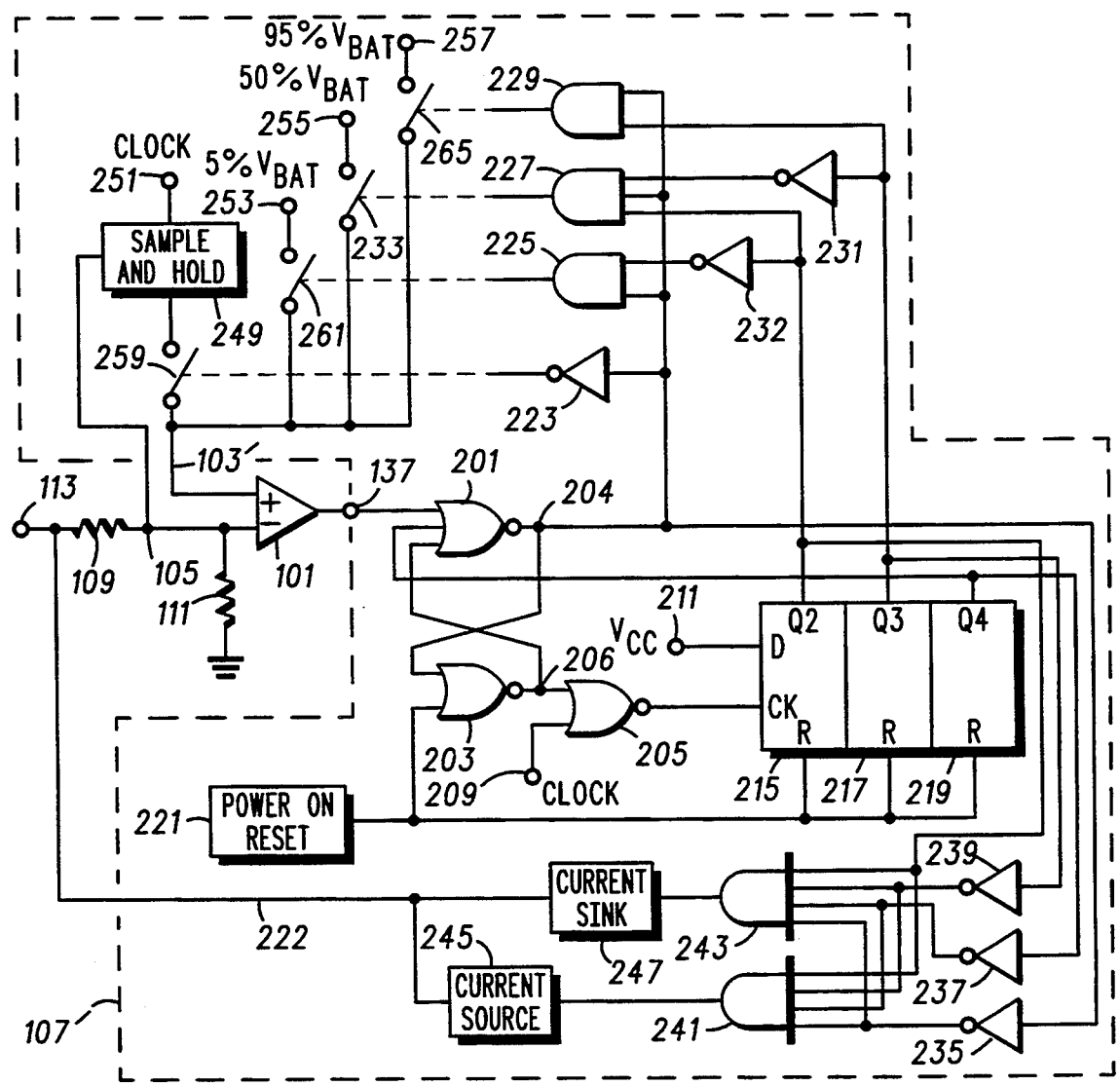

RECTIFIER LEAKAGE COMPENSATED ALTERNATOR PHASE DETECTION SYSTEM AND METHOD

FIELD OF THE INVENTION

This invention is generally directed to the field of alternator based charging systems, and specifically for detecting excitation of an alternator stator winding dependent on rotation of same.

BACKGROUND OF THE INVENTION

Contemporary alternator based charging systems in vehicular applications typically rely on a determination of a state of alternator rotation for changing an operating mode of a regulator. A startup state indicates that the alternator is not rotating—thus stationary. A rotating state indicates that the alternator is rotating—thus providing energy to charge a vehicle's battery. Preferably, during the startup state of the alternator, the regulator is constrained to have a limited duty-cycle to reduce battery discharge current. Also, during the startup state of the alternator, an indicator lamp is illuminated to show that the alternator is stationary.

In a prior art circuit shown in FIG. 1 this alternator rotation state is detected by an alternator phase detection system 139 comprised of a comparator 101 in cooperation with threshold circuitry. The comparator 101 compares a signal generated from alternator stator windings 115, 117, and 119 at a connection terminal 113 scaled by resistors 109 and 111, with a reference signal 103 generated by a voltage threshold generator 107. In operation, when an ignition switch 135 is initially closed, a battery 143 is connected to and powers the alternator phase detection system 139. While the vehicle's engine is stationary the alternator is stationary and the signal generated at connection terminal 113 is ideally zero volts. Responsive to this condition the comparator 101 outputs a startup state of a status signal at its output terminal 137. This startup state is a DC level. When the alternator commences rotation, responsive to the engine starting, the signal generated at connection terminal 113 increases. When the signal generated at connection terminal 113 exceeds a magnitude of the reference signal 103, the comparator 101 outputs a rotating state of the status signal at its output terminal 137. The rotating state is a signal with transitions.

In some prior art circuits the voltage threshold generator 107 is a simple voltage reference. Typically, this may take the form of a band-gap voltage reference circuit. A problem with this approach is that rectifier leakage in rectifiers 121, 123, 125, 127, 129 and 131 can cause a DC voltage to appear at connection terminal 113 while the alternator is stationary. This DC voltage, or error, can be significant. In fact it can exceed the reference signal 103 while the alternator is stationary—thus falsely indicating that the alternator is in a rotating state if the following circuit is level sensitive or a reduced sensitivity if it is transition sensitive.

Other prior art voltage threshold generators use a sample-and-hold circuit in the voltage threshold generator 107. This sample-and-hold circuit samples a voltage at the junction of resistors 109 and 111 provided by the signal at connection terminal 113 before the alternator can start rotating. This sampled voltage is used to determine the threshold signal 103 to account for the above-described rectifier leakage, or DC error. If a DC leakage is present at the stator winding 115, due to the rectifiers 123 and 129, then the resultant DC signal representative of the leakage will dominate the AC signal representative of the stator winding excitation associated with the alternator rotation. This will significantly reduce the effective sensitivity of the circuit 139 because the DC component of the signal will swamp out the AC component of the signal, particularly if the resulting DC voltage provided at terminal 113 is proximate one-half the battery voltage, so that the rectifiers do not conduct until the AC signals related to stator winding excitation are very large—usually only at high alternator rotational speed. In other prior art systems this possible sensitivity loss has been compensated by connecting a comparator between two of the alternator stator-rectifier circuits. This in-effect solves the sensitivity problem but it is expensive and difficult to manufacture because of the extra connections required to get the second stator winding signal to the alternator phase detection system 139. In particular, a wire-bonding pad has to be added to a regulator IC to connect the second signal. This can add significantly to the regulator IC die size, process time, and thus cost.

What is needed is an improved alternator phase detection system that is less sensitive to rectifier leakage effects and is cost effective.

BRIEF DESCRIPTION OF THE DRAWINGS

FIG. 1 is a schematic showing a prior art alternator based charging system including an alternator phase detection circuit; and FIG. 2 is a schematic illustration of an improved phase detection circuit in accordance with a preferred embodiment of the invention.

DETAILED DESCRIPTION OF A PREFERRED EMBODIMENT

In a preferred embodiment an alternator phase detection system for an alternator has a stator winding that provides a stator winding signal bounded within a range. The stator winding signal has a leakage magnitude when the alternator is stationary and a variable, or charging, magnitude when the alternator is rotating. Essentially the leakage magnitude is typically a DC error associated with leakage in rectifiers located in the alternator's stator circuit, and the charging magnitude represents an AC component generated during rotation of the alternator. A leakage compensation circuit biases the stator winding of the alternator if the leakage magnitude of the stator winding signal is positioned distal, or apart from, a boundary of the range, thereby changing the magnitude of the stator winding signal. A comparator circuit provides an alternator startup state of a status signal if the magnitude of the changed stator winding signal does not exceed a predetermined threshold. Biasing the stator winding with the leakage compensation circuit essentially forces a compensating signal to flow through the alternator's rectifiers. This compensating signal both negates the erroneous effect of rectifier leakage on the measurement of alternator motion, but also enables detection of alternator motion sooner as the initial error associated with the leakage in the rectifiers is negated.

Preferably, the bias of the alternator stator winding is only put into effect when the leakage magnitude, associated with the signal derived from the alternator stator winding at terminal 113, is distal either a ground or VBatt boundary of the voltage operating range of the stator winding. For instance, the bias would only be applied to compensate for rectifier leakage if the leakage caused the stator winding to output a voltage between 5% of VBatt and 95% of VBatt. If the leakage magnitude was between a value median within the bounded range and one boundary of the range, then it would be biased to force it to the most proximate boundary. For instance given a 12 volt battery the range is 0 to 12 volts and the median value within the range is 6 volts. If the leakage magnitude is 7 volts then the bias would force the leakage magnitude to approximately 12 volts. Conversely, if the leakage magnitude was 5.9 volts then the bias would force the leakage magnitude to reside proximate zero volts—or ground. So, the biasing of the alternator stator winding has a positive magnitude when the leakage magnitude of the stator winding signal has a magnitude greater than a median value of the range, and the biasing of the alternator stator winding has a negative magnitude when the leakage magnitude of the stator winding signal has a magnitude less than the median value of the range.

A further appreciation of the preferred embodiment of the invention will be grasped after review of FIG. 2. FIG. 2 contains components 109, 111 and 101 which function as described in the Background section to operate on the signal derived from the alternator stator winding at terminal 113 for the purpose of determining whether or not the alternator is rotating. Here, the voltage threshold generator 107 is replaced by a circuit 107' that not only generates a programmable reference, or threshold, signal 103' but also a provides rectifier leakage compensation signal 222 that is generated to influence any leakage in the rectifiers 123, 129 associated with the alternator stator winding 115.

After initialization, the circuit 107' tests to see if the leakage caused by the rectifiers 123, 129 is relatively low. If the leakage is relatively low then the signal at terminal 113 can be used to set the programmable reference signal 103'. If the leakage is somewhat higher, then a compensation current 222 is withdrawn from the alternator stator winding to counteract the effects of the leakage. If the leakage is significantly higher, then a compensation current 222 is added to the alternator stator winding to counteract the effects of the leakage.

The operation of the circuitry, referred to by reference number 107', is initiated by a power-on reset signal 224 generated by a power-on reset circuit 221 when the ignition switch 135 described in the Background section in reference to FIG. 1 is closed. Alternatively, the signal 224 could be taken from some other source, such as a periodic clock signal so that changes in the rectifier's 121, 123, 125, 127, 129, and 131 leakage, with for example time, could be tracked, even if the power is not turned off and on again.

The power-on reset signal 224 supplied by the power-on reset circuit 221 forces a flip-flop comprised of cross coupled logical NOR gates 201, 203 into a condition where an output 204 of logical NOR gate 201 is at a logical-one state, and an output 206 of the logical NOR gate 203 is at a logical-zero state. The power-on reset signal 224 also initializes a shift register comprised of D flip-flops 215, 217, and 219. Upon receipt of the power-on reset signal 224, Q outputs of the D flip-flops 215, 217, and 219 are all reset to a logical-zero state. Also, because the Q outputs of the shift register D flip-flops 215, 217, and 219 are providing a logical-zero state, logical AND gates 241 and 243 disable a current source 245 and a current sink 247 respectively. This action assures that the rectifier leakage compensation signal 222 is not provided to the terminal 113. Also, during the initialization of circuit 107' a continuous clock signal is generated and provided at two terminals 209 and 251. Preferably, an integral oscillator provides the continuous clock signal 209, 251 at 500 Hz. The continuous clock signal 209, 251 will be used to control the operation of the circuit 107'.

Now that the circuit 107' is initialized, selection of the programmable reference signal 103' will commence. First, since the output 204 of the logical NOR gate 201 is providing a logical-one state to an inverter 223, a switch 259 is held open. Since switch 259 is open a sample-and-hold circuit 249 is disconnected from the comparator 101. A logical AND gate 225, acting on the logical-one state provided by the output 204 of the logical NOR gate 201 and an inversion of the Q output of the D flip-flop 215, forces a switch 261 closed. This action causes a voltage, provided at terminal 253 that represents 5% of a battery's voltage, to be connected to the comparator 101. The purpose of this action is to test to see if a voltage present at the junction 105 of resistors 109 and 111, caused by leakage in rectifiers 123 and 129 has a magnitude lower than the voltage provided at terminal 253. If the voltage present at the junction 105 of resistors 109 and 111 has a magnitude lower than the voltage provided at terminal 253, then the leakage caused by rectifiers 123 and 129 is relatively low and the voltage present at the junction 105 can be used to determine the programmable reference signal 103' as follows.

If, when the switch 261 is initially closed, the voltage present at the junction 105, caused by rectifier 123, 129 leakage, has a magnitude less than the voltage provided at terminal 253, then the comparator 101 will provide a logical-one state at its output terminal 137 to the logical NOR gate 201. The provision of the logical-one state to the logical NOR gate 201 will cause the flip-flop 201, 203 to toggle so that the output 204 of logical NOR gate 201 will transition to a logical-zero state which action will open switch 261 via gate 225. The transition to the logical-one state of the output 204 of the logical NOR gate 201 also will cause switch 259 to close through the control of an inverter 223. Given that the logical NOR gate 203 is providing a logical-one state to another logical NOR gate 205, the continuous clock signal 209 is now not provided to the shift register 215, 217, 219. The sample and hold circuit 249 periodically captures the voltage present at the junction 105 and stores it to later be provided to the comparator 101, via switch 259. The resultant programmable reference, or threshold, signal 103' is used by the comparator 101 to compensate for offset voltage caused by DC rectifier leakage associated with the above-mentioned leakage magnitude.

In contrast with the above-detailed example, if, when the switch 261 is initially closed, the voltage present at the junction 105, caused by rectifier 123, 129 leakage, has a magnitude greater than the voltage provided at terminal 253, then the comparator 101 will provide at its output terminal 137 a logical-zero state to the logical NOR gate 201. This will allow the flip-flop 201, 203 to remain in its initial state. This condition allows the continuous clock signal 209 to cause a logical-one signal, provided at the Vcc terminal 211 to be clocked into the first D flip-flop 215 of the shift register comprised of 215, 217, 219. A resultant logical-one state provided at the Q output of D flip-flop 215 will ensure that switch 261 remains open through the control of an inverter 232 and the logical AND gate 225. Also, the switch 233 will be closed through the control of a logical AND gate 227 and an inverter 231. With switch 233 closed the programmable reference signal 103' now is provided by a voltage provided at terminal 255 that represents 50% of the battery's voltage, which is provided to the comparator 101.

If, when the switch 233 is initially closed, the voltage present at the junction 105, caused by rectifier 123, 129 leakage, has a magnitude less than the voltage provided at terminal 255, then the comparator 101 will provide a logical-zero state at its output terminal 137 to the logical NOR gate 201. This action, as described above, will cause the output 204 of the logical NOR gate 201 of the flip-flop 201, 203 to transition to a logical-zero state, which will cause the output 206 of the logical NOR gate 203 to transition to a logical-one state which will disable the provision of the continuous clock signal 209 to the shift register 215, 217, 219, via the action of the logical NOR gate 205.

That the magnitude of the voltage present at the junction 105, caused by rectifier 123, 129 leakage is less than the voltage provided at terminal 255, in cooperation with the earlier described actions, indicates that the rectifier 123 leakage causes the voltage present at the junction 105 to reside between 5% and 50% of the battery voltage. To improve the sensitivity of the alternator phase detection system 139 a leakage compensation current will be injected into the alternator's stator winding 115. This action not only compensates the voltage at the junction 105 but also biases the rectifiers 123, 129, removing any DC current related error to condition them to respond directly to any AC current excitation related to alternator rotation. This solution offers a significant improvement over the prior art approaches. In this case, where the voltage present at the junction 105 to resides between 5% and 50% of the battery voltage, the rectifier leakage compensation signal 222 is provided by the current sink 247 which pulls current out of the rectifier 123 thus lowering the voltage of the signal provided at terminal 113, thereby lowering the voltage present at the junction 105. The current sink is enabled via the logical AND gate 243 whose inputs guaranty a logical-one output state. Note that preferably, the current sink 247 and the current source 245 provide between 1 to 10 milliamps.

When the magnitude of the voltage present at the junction 105, caused by rectifier 123, 129 leakage is greater than the voltage provided at terminal 255, then the rectifier 123 leakage causes the voltage present at the junction 105 to reside between 50% of the battery voltage and the full battery voltage. In this case the comparator continues to provide a logical-one state at the output 204 of the logical NOR gate 201 and a logical-zero state at the output 206 of the logical NOR gate 203. The logical-zero state at the output 206 of the logical NOR gate 203 continues to enable the provision of the continuous clock signal 209 to the shift register 215, 217, 219, via the action of the logical NOR gate 205. This action allows another of the continuous clock signals 209 to clock the shift register which causes the Q output of D flip-flop 217 to transition to a logical-one state. This now opens switch 233 under the control of the logical AND gate 227 and closes switch 265 under the control of the logical AND gate 229. This action causes the programmable reference signal 103' to rise to a voltage provided at terminal 257 representing 95% of the battery's voltage, which is provided to the comparator 101. In this case if the magnitude of the signal present at the junction 105 is lower than the programmable reference signal 103', then the comparator 101 will provide a logical-one state at its output terminal 137 to the logical NOR gate 201. This action will cause the output 204 of the logical NOR gate 201 of the flip-flop 201, 203 to transition to a logical-zero state. This will act to open switch 265 under the control of the logical AND gate 229 and close switch 259, under the control of the inverter 223. Furthermore, this action also enables the current source 245 to turn on while the current sink 247 is held off-the opposite of the former case. This is because a magnitude of the signal present at the junction 105 is in a range located between 50% VBatt and 95% VBatt.

If the magnitude of the signal present at the junction 105 is still higher than the programmable reference signal 103', then the comparator 101 will provide a logical-zero state at its output terminal 137 to the logical NOR gate 201. This action will cause the provision of a logical-zero state at the output 206 of the logical NOR gate 203 of the flip-flop 201, 203. Through the action of the logical NOR gate 205 another of the continuous clock signals 209 clocks the shift register 215, 217, 219 which causes the Q output of D flip-flop 219 to transition to a logical-one state. The logical-one state present at the Q output of D flip-flop 219 will prevent any more continuous clock signals 209 from clocking the shift register 215, 217, 219. The logical-zero state at the output terminal 137 of the logical NOR gate 201 will cause switch 259 to close under the control of the inverter 223, and cause the switch 265 to open, under the control of the logical AND gate 229. With the Q output of flip-flop 219 outputting a logical-one state both the current sink 247 and the current source 245 are disabled. Under this condition the circuit's operation is virtually identical to that when the signal present at the junction 105 is less than 5% of VBatt.

Note that the reference voltages of 5% VBatt, 50% VBatt and 95% VBatt may be derived from a resistive network between VBatt and circuit ground, which also allows for the scaling of resistor 109, 111. The reason that the current source 245 and current sink 247 provide the rectifier leakage compensation signal 222 to reinforce the natural leakage is that this tends to produce a change in the voltage to the closest supply rail and hence the most effect for a limited current. The idea being that the closer you are to a supply rail the smaller the AC signal on the stator winding which will cause the rectifiers to conduct, and hence force an AC voltage onto even a leaky stator winding node.

In conclusion an improved alternator phase detection system that is less sensitive to rectifier leakage effects and is cost effective has been described. Addition of either a sink or source current to an alternator stator winding significantly impacts the measurement of the alternator's motion. Also, by avoiding a differential interconnect a signal path has been eliminated—thus saving interconnect cost and making the system more reliable.

What is claimed is:

1. An alternator phase detection system for an alternator having a stator winding that provides a stator winding signal bounded within a range, wherein the stator winding signal has a leakage magnitude when the alternator is stationary and a charging magnitude when the alternator is rotating, the alternator phase detection system comprising:

leakage compensation means for biasing the stator winding of the alternator if the leakage magnitude of the stator winding signal is positioned distal a boundary of the range, wherein the biasing of the stator winding changes the magnitude of the stator winding signal; and comparator means for providing an alternator startup state of a status signal if the magnitude of the changed stator winding signal does not exceed a predetermined threshold.

2. An alternator phase detection system in accordance with claim 1 wherein the comparator means provides a rotating state of the status signal if the magnitude of the changed stator winding signal exceeds the predetermined threshold.

3. An alternator phase detection system in accordance with claim 1 wherein the biasing of the stator winding has a positive magnitude when the leakage magnitude of the stator winding signal has a magnitude greater than a median value of the range.

4. An alternator phase detection system in accordance with claim 1 wherein the biasing of the stator winding has a negative magnitude when the leakage magnitude of the stator winding signal has a magnitude less than a median value of the range.

5. An alternator phase detection system in accordance with claim 1 wherein the biasing of the stator winding causes the magnitude of the stator winding signal to be forced towards the boundary of the range positioned distal the leakage magnitude of the stator winding signal.

6. An alternator phase detection system for an alternator having a stator winding that provides a stator winding signal bounded within a range, wherein the stator winding signal has a leakage magnitude when the alternator is stationary and a variable magnitude when the alternator is rotating, the alternator phase detection system comprising:

a leakage compensation circuit for providing a leakage compensation current to the stator winding of the alternator if the leakage magnitude of the stator winding signal is positioned apart from a boundary of the range, wherein the provision of leakage compensation current to the stator winding changes the magnitude of the stator winding signal; and a comparator circuit for providing an alternator startup state of a status signal if the magnitude of the changed stator winding signal does not exceed a predetermined threshold.

7. An alternator phase detection system in accordance with claim 6 wherein the comparator means provides a rotating state of the status signal if the magnitude of the changed stator winding signal exceeds the threshold signal.

8. An alternator phase detection system in accordance with claim 7 wherein the provision of leakage compensation current to the stator winding has a positive magnitude when the leakage magnitude of the stator winding signal has a magnitude greater than a median value of the range.

9. An alternator phase detection system in accordance with claim 8 wherein the provision of leakage compensation current to the stator winding has a negative magnitude when the leakage magnitude of the stator winding signal has a magnitude less than the median value of the range.

10. An alternator phase detection system in accordance with claim 6 wherein the provision of leakage compensation current to the stator winding causes the magnitude of the stator winding signal to be forced towards the boundary of the range positioned apart from the leakage magnitude of the stator winding signal.

11. An alternator phase detection system to be coupled to an alternator device, wherein the alternator device is comprised of a rectifier circuit having a junction terminal coupled to an alternator stator winding and two terminals opposite the junction terminal coupled across a voltage source, wherein a stator winding signal having a leakage magnitude is provided at the junction terminal when the alternator stator winding is stationary, and a variable magnitude signal when the alternator stator winding is rotating, the alternator phase detection system comprising:

a leakage compensation circuit for providing a leakage compensation current to the junction terminal of the rectifier circuit if the leakage magnitude of the stator winding signal is positioned apart from a boundary of the voltage source, wherein the provision of leakage compensation current to the stator winding changes the magnitude of the stator winding signal provided at the junction terminal of the rectifier circuit; and a comparator circuit, operatively coupled to the leakage compensation circuit, for providing an alternator startup state of a status signal if the changed magnitude of the stator winding signal does not exceed a predetermined threshold.

12. An alternator phase detection system in accordance with claim 11 wherein the provision of the leakage compensation current to the rectifier circuit causes the stator winding signal to be forced towards the boundary of the voltage source positioned apart from the leakage magnitude of the stator winding signal.

13. An alternator phase detection system in accordance with claim 12 wherein the provision of the leakage compensation current to the rectifier circuit comprises providing the leakage compensation current to the rectifier circuit that is variable dependent on the magnitude of the leakage.

14. A method of phase detection for an alternator having a stator winding that provides a stator winding signal bounded within a range, wherein the stator winding signal has a leakage magnitude when the alternator is stationary and a charging magnitude when the alternator is rotating the phase detection method comprising the steps of:

biasing the stator winding of the alternator if the leakage magnitude of the stator winding signal is positioned distal a boundary of the range, wherein the biasing of the stator winding changes the magnitude of the stator winding signal; and providing an alternator startup state of a status signal if the magnitude of the changed stator winding signal does not exceed a predetermined threshold.

15. A method in accordance with claim 14 wherein the step of providing comprises providing a rotating state of the status signal if the magnitude of the changed stator winding signal exceeds the predetermined threshold.

16. A method in accordance with claim 15 wherein the biasing of the stator winding has a positive magnitude when the leakage magnitude of the stator winding signal has a magnitude greater than a median value of the range.

17. A method of phase detection for an alternator having a stator winding that provides a stator winding signal bounded within a range, wherein the stator winding signal has a leakage magnitude when the alternator is stationary and a charging magnitude when the alternator is rotating the phase detection method comprising the steps of:

providing a stator winding signal bounded within a range, wherein the stator winding signal has a leakage magnitude when the alternator is stationary and a charging magnitude when the alternator is rotating;

providing a threshold signal that is adjustable dependent on the leakage magnitude of the alternator stator winding signal, and for biasing the stator winding of the alternator if the leakage magnitude of the stator winding signal is positioned distal a boundary of the range, wherein the biasing of the stator winding changes the magnitude of the stator winding signal; and providing an alternator startup state of a status signal if the magnitude of the changed stator winding signal does not exceed a predetermined threshold.

18. A method in accordance with claim 17 wherein the step of providing comprises providing a rotating state of the status signal if the magnitude of the changed stator winding signal exceeds the predetermined threshold.

19. A method in accordance with claim 18 wherein the biasing of the stator winding has a positive magnitude when the leakage magnitude of the stator winding signal has a magnitude greater than a median value of the range.

20. A method in accordance with claim 19 wherein the biasing of the stator winding has a negative magnitude when the leakage magnitude of the stator winding signal has a magnitude less than the median value of the range.

* * * * *

UNITED STATES PATENT AND TRADEMARK OFFICE
CERTIFICATE OF CORRECTION

PATENT NO. : 5,449,999
DATED : 9/12/95
INVENTOR(S) : Edwards, A. J.

It is certified that error appears in the above-indentified patent and that said Letters Patent is hereby corrected as shown below:

In the Abstract, in the next to the last line, "noir" should be --not--.

Signed and Sealed this

Twenty-third Day of April, 1996

Attest:

BRUCE LEHMAN

Attesting Officer

Commissioner of Patents and Trademarks